(12) United States Patent
Kubota

(10) Patent No.: US 11,287,797 B2
(45) Date of Patent: Mar. 29, 2022

(54) NUMERICAL CONTROL DEVICE

(71) Applicant: FANUC CORPORATION, Yamanashi (JP)

(72) Inventor: Toom Kubota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/559,992

(22) Filed: Sep. 4, 2019

(65) Prior Publication Data
US 2020/0117165 A1   Apr. 16, 2020

(30) Foreign Application Priority Data

Oct. 11, 2018 (JP) .............................. JP2018-192659

(51) Int. Cl.
*G05B 19/406* (2006.01)

(52) U.S. Cl.
CPC ...................... *G05B 19/406* (2013.01); *G05B 2219/32128* (2013.01); *G05B 2219/34367* (2013.01)

(58) Field of Classification Search
CPC ........ G05B 19/406; G05B 2219/32128; G05B 2219/34359; G05B 2219/34367
See application file for complete search history.

(56) References Cited

U.S. PATENT DOCUMENTS

| 3,668,653 | A | * | 6/1972 | Fair | ...................... | G05B 19/371 700/1 |
| 4,597,040 | A | * | 6/1986 | Buizer | ................. | G05B 19/182 318/572 |
| 5,038,318 | A | * | 8/1991 | Roseman | ............. | G05B 19/052 712/30 |
| 5,189,624 | A | * | 2/1993 | Barlow | ............ | G05B 19/41895 700/169 |

(Continued)

FOREIGN PATENT DOCUMENTS

| JP | 59-9706 | 1/1984 |
| JP | 7-36529 | 2/1995 |

(Continued)

OTHER PUBLICATIONS

Notification of Reasons for Refusal dated Nov. 4, 2020 in corresponding Japanese Patent Application No. 2018-192659.

(Continued)

*Primary Examiner* — Chad G Erdman
(74) *Attorney, Agent, or Firm* — Wenderoth, Lind & Ponack, L.L.P.

(57) ABSTRACT

A numerical control device that suspends tasks related to a machining process when designated conditions are satisfied to execute a designated program as an interrupt. A numerical control device includes: a task management unit that manages tasks that execute a machining program and tasks executed on the background of the tasks that execute the machining program; an interrupt notification unit that monitors system data set to an interrupt condition designated in advance and outputs an interrupt command upon detecting (Continued)

that the interrupt condition is satisfied; and an interrupt processing unit that suspends the tasks being executed at a time point when the interrupt command was received to execute a predetermined interrupt program as an interrupt on the basis of the interrupt command output by the interrupt notification unit.

4 Claims, 6 Drawing Sheets

(56) References Cited

U.S. PATENT DOCUMENTS

| | | | |
|---|---|---|---|
| 6,442,436 B1* | 8/2002 | Nogami | G06F 11/3404 318/565 |
| 2014/0082240 A1* | 3/2014 | Coleman | G06F 9/45558 710/260 |

FOREIGN PATENT DOCUMENTS

| | | |
|---|---|---|
| JP | 3327641 | 9/2002 |
| JP | 2010-26660 | 2/2010 |
| JP | 2011-096114 | 5/2011 |
| JP | 2013-084169 | 5/2013 |

OTHER PUBLICATIONS

Decision of Refusal issued in corresponding JP Patent Application No. 2018-192659, dated Jan. 26, 2021.
Notification of Reasons for Refusal issued in corresponding Japanese Patent Application No. 2018-192659, dated Sep. 21, 2021.

* cited by examiner

FIG. 4A

| INTERRUPT FUNCTION | ENABLED |
|---|---|
| INTERRUPT CONDITION | #100 EQ 1 |
| INTERRUPT PROGRAM | 600 |

FIG. 4B

| INTERRUPT FUNCTION | ENABLED |
|---|---|
| INTERRUPT CONDITION | #100 EQ 1 |
| INTERRUPT PROGRAM | #98000 = #100<br>#98001 = #101<br>#98002 = R100<br>#98003 = #2001<br>#98004 = #2002 |

NUMERICAL CONTROL DEVICE

This application is based on and claims the benefit of priority from Japanese Patent Application No. 2018-192659, filed on 11 Oct. 2018, the content of which is incorporated herein by reference.

BACKGROUND OF THE INVENTION

Field of the Invention

The present invention relates to a numerical control device that controls a machine tool and more particularly relates to a numerical control device that suspends tasks being executed, of the numerical control device when designated conditions are satisfied to execute a designated program as an interrupt.

Related Art

Conventionally, a numerical control device includes an interrupt monitoring unit that monitors system data designated by an interrupt condition designated in advance and outputs an interrupt command when the interrupt condition is satisfied during debugging of a machining program, for example, and an interrupt program execution unit that interrupts tasks of the machining program according to the interrupt command and executes an interrupt program designated in advance. Patent Document 1 discloses a numerical control device that controls numerically controlled machine tools, including: an interrupt monitoring unit that monitors system data defined in an interrupt condition of an interrupt-type NC program and outputs an interrupt processing command when the interrupt condition is satisfied; and an interrupt processing program execution unit that executes an interrupt processing program of the interrupt-type NC program according to the interrupt processing command, wherein the interrupt condition include an execution method of the interrupt processing program, and the interrupt processing program execution unit executes the interrupt processing program according to the execution method.

Patent Document 1: Japanese Patent No. 3327641

SUMMARY OF THE INVENTION

The interrupt-type NC program disclosed in Patent Document 1 includes an interrupt condition 4a and an interrupt processing program 4b. The interrupt condition 4a defines conditions for executing the interrupt processing program 4b, and for example, conditions for executing the interrupt processing program 4b when a specific alarm occurs are defined. The interrupt processing program is a processing program executed when the interrupt condition matches, and the details of the processing are a return to the origin or recording of specific system data. However, the interrupt processing by the interrupt-type NC program disclosed in Patent Document 1 involves suspending execution of a machining program being executed when the interrupt condition is satisfied when the numerical control device is executing the machining program, executing the interrupt processing program 4b in a task for executing the machining program, and resuming the suspended machining program after execution of the interrupt processing program 4b. Therefore, a control application of a ladder or a peripheral device executed on the background (more specifically, on a task of the machining program, different from the tasks executed) other than the machining program is continuously executed without being suspended. FIG. 7 illustrates a state in which a machining program is suspended when the interrupt condition is satisfied during execution of the machining program. As illustrated in FIG. 7, when execution of a machining program being executed is suspended to execute the interrupt processing program 4b when the interrupt condition is satisfied, a control application of a ladder or a peripheral device executed on the background (more specifically, on a task of the machining program, different from the tasks executed) is not suspended. Therefore, in a period (between time $T_1$ and $T_2$) until a machining program is suspended after an interrupt condition is satisfied, when a control application of a ladder or a peripheral device (for example, a coolant control device or the like) updates specific system data (for example, a variable or a signal of a numerical control device), the interrupt processing program 4b may be unable to know an accurate value of the specific system data when the interrupt condition is satisfied. Therefore, in order to know an accurate value of the specific system data when the interrupt condition is satisfied, it is necessary to execute the interrupt processing program as an interrupt by suspending a task for executing a machining program for machining a work, a task for executing a ladder on the background during the machining, and a task for executing an application executed on the background during the machining when the interrupt condition is satisfied.

An object of the present invention is to provide a numerical control device that executes a designated program as an interrupt by suspending a task for executing a machining program for machining a work, a task for executing a ladder executed on the background during the machining, and a task for executing an application executed on the background during the machining when designated conditions are satisfied.

(1) A numerical control device (for example, a numerical control device 1 to be described later) according to the present invention includes a control unit (for example, a CPU 11 to be described later), wherein the control unit includes: a task management unit (for example, a task management unit 111 to be described later) that manages tasks that execute a machining program and tasks executed on the background of the tasks that execute the machining program; an interrupt notification unit (for example, an interrupt notification unit 113 to be described later) that monitors system data set to an interrupt condition designated in advance and outputs an interrupt command upon detecting that the interrupt condition is satisfied; and an interrupt processing unit (for example, an interrupt processing unit 114 to be described later) that suspends the tasks being executed at a time point when the interrupt command was received to execute a predetermined interrupt program as an interrupt on the basis of the interrupt command output by the interrupt notification unit.

(2) The numerical control device according to (1) may further include a storage unit (for example, a RAM 13 to be described later), wherein the interrupt program may execute a process of storing, in the storage unit, a value of arbitrary system data including a value of a signal designated in advance, a value of a variable designated in advance, or an offset value designated in advance.

(3) The numerical control device according to (1) or (2) may further include a display (for example, a display/MDI unit 70 to be described later), wherein the control unit may further include: an interrupt condition input unit (for example, an interrupt condition input unit 112 to be described later) that provides a user interface for designating the interrupt condition and the interrupt program executed as an interrupt when the interrupt condition is satisfied.

(4) In the numerical control device according to (3), the interrupt condition input unit may further provide a user interface for enabling or disabling an interrupt function.

According to the present invention, it is possible to provide a numerical control device that executes a designated program as an interrupt by suspending a task for executing a machining program for machining a work, a task for executing a ladder executed on the background during the machining, and a task for executing an application executed on the background during the machining when designated conditions are satisfied. Due to this, it is possible to know an accurate value of system data related to a numerical control device when the interrupt condition is satisfied, for example.

BRIEF DESCRIPTION OF THE DRAWINGS

FIG. 4A is a diagram illustrating an example of a user interface provided by an interrupt condition unit according to the embodiment.

FIG. 4B is a diagram illustrating an example of a user interface provided by an interrupt condition unit according to the embodiment.

DETAILED DESCRIPTION OF THE INVENTION

Figure 1:
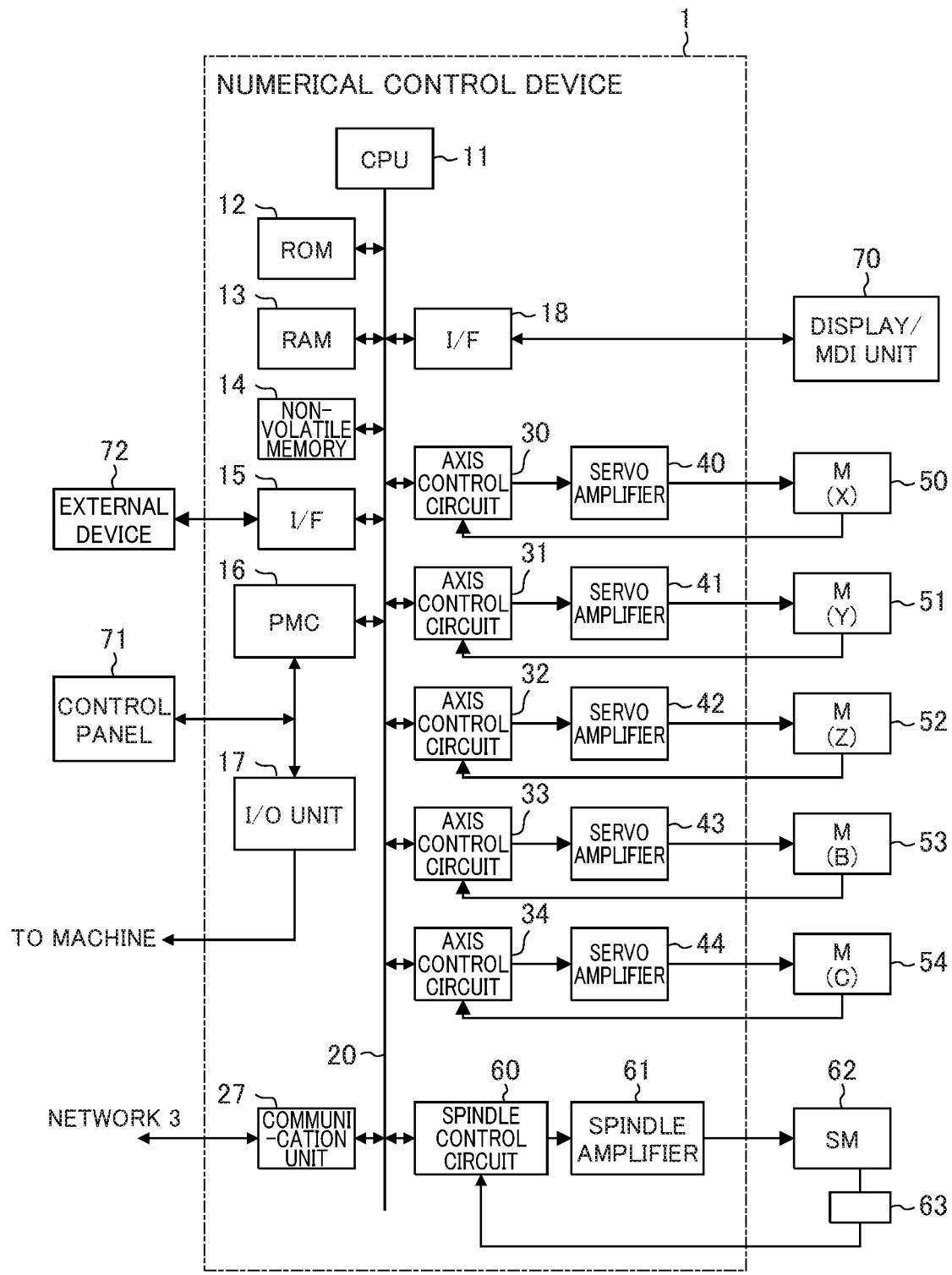
FIG. 1 is a block diagram illustrating a hardware configuration of a main part of a numerical control device according to an embodiment.

Hereinafter, an example of an embodiment of the present invention will be described. FIG. 1 is a block diagram illustrating a hardware configuration of a main part of a numerical control device 1 according to the present embodiment. In the numerical control device 1, a CPU 11 is a processor that controls an entire part of the numerical control device 1. The CPU 11 reads a system program stored in a ROM 12 via a bus 20 and controls the entire part of the numerical control device 1 according to the system program. Transitory computation data, display data, and various kinds of data input by an operator via a display/MDI unit 70 are stored in the RAM 13. Moreover, since access to a RAM is faster than access to a ROM, the CPU 11 may deploy the system program stored in the ROM 12 in advance onto the RAM 13 and read the system program from the RAM 13 to execute the system program. Moreover, the RAM 13 may include a system data area (not illustrated) to be described later. Here, system data of the numerical control device 1 is stored in the system data area. Various kinds of data such as an alarm number indicating an alarm, a DI/DO signal (an input/output signal of a numerical control device), a macro variable used by a macro program, a pitch error correction amount, and a tool correction amount are stored as the system data, for example. A non-volatile memory 14 is a magnetic storage device, a flash memory, an MRAM, an FRAM (registered trademark), an EEPROM, or a battery-backed up SRAM or DRAM, and is configured as a non-volatile memory of which the storage state is maintained even if the numerical control device 1 is powered off. A machining program, parameters, and the like input via an interface 15, the display/MDI unit 70, or a communication unit 27 are stored in the non-volatile memory 14. Moreover, parameters and the like required by a programmable machine controller (PMC) 16 to be described later are stored.

Various system programs for performing editing mode processing required for creating and editing a machining program and processing for automated operation are written in advance in the ROM 12. Moreover, a system program for allowing the CPU 11 to function as a task management unit 111, an interrupt condition input unit 112, an interrupt notification unit 113, and an interrupt processing unit 114 to be described later is written in advance in the ROM 12.

Various machining programs are input via the interface 15, the display/MDI unit 70, or the communication unit 27 and are stored in the non-volatile memory 14.

The interface 15 connects the numerical control device 1 and an external device 72. A machining program, various parameters, and the like are read from the external device 72 into the numerical control device 1. Moreover, a machining program edited in the numerical control device 1 can be stored in an external storage device via the external device 72. Specific examples of the interface 15 include a RS232C, a USB, a SATA, a PC card slot, a CF card slot, an SD card slot, the Ethernet (registered trademark), and Wi-Fi. The interface 15 may be present on the display/MDI unit 70. Examples of the external device 72 include a computer, a USB memory, a CFast, a CF card, and an SD card.

The PMC 16 outputs a signal to an auxiliary device (for example, an automatic tool replacement device) of a machine tool via an I/O unit 17 and controls the auxiliary device according to a program stored in the numerical control device 1. Moreover, the PMC 16 receives signals of various switches and the like of a control panel 71 disposed in a main body of the machine tool, performs necessary signal processing, and then, delivers the processed signals to the CPU 11. The PMC 16 is generally called a programmable logic controller (PLC). For example, the PMC 16 receives a command signal such as an M-function command and a T-function command, processes the command according to conditions determined in advance, and outputs the processed signal to a machine via the I/O unit 17. In contrast, as for a limit switch signal of a machine input via the I/O unit 17 and an input signal of an operation switch of a control panel, the PMC 16 transmits an input signal which does not need to be processed by the PMC 16 to the CPU 11, processes the other signals according to conditions determined in advance, and outputs some of the signals to the CPU 11 and the other signals to the machine via the I/O unit 17. The control panel 71 is connected to the PMC 16. The control panel 71 may include a manual pulse generator or the like. The display/MDI unit 70 is a manual data input device having a display (a display unit) and an operating unit such as a keyboard or a touch panel. The interface 18 transmits display screen data to the display of the display/MDI unit 70, receives commands and data from the operating unit of the display/MDI unit 70, and delivers the commands and data to the CPU 11.

Axis control circuits 30 to 34 of respective axes receive movement amount commands for respective axes from the CPU 11 and output the commands for the respective axes to servo amplifiers 40 to 44. The servo amplifiers 40 to 44 receive the commands to drive servo motors 50 to 54 of the respective axes. The servo motors 50 to 54 of the respective axes each include position and velocity detectors and feed position and velocity feedback signals back to the axis control circuits 30 to 34 to perform feedback control of position and velocity.

A spindle control circuit 60 receives a spindle rotation command for the machine tool and outputs a spindle velocity signal to a spindle amplifier 61. The spindle amplifier 61 receives the spindle velocity signal to cause a spindle motor 62 of the machine tool to rotate at the commanded rotation velocity to drive the tool. A pulse encoder 63 is coupled to the spindle motor 62 by a gear, a belt, or the like, and the pulse encoder 63 outputs a feedback pulse in synchronization with rotation of the spindle, and the feedback pulse is read by the CPU 11 via the bus 20.

Figure 2:
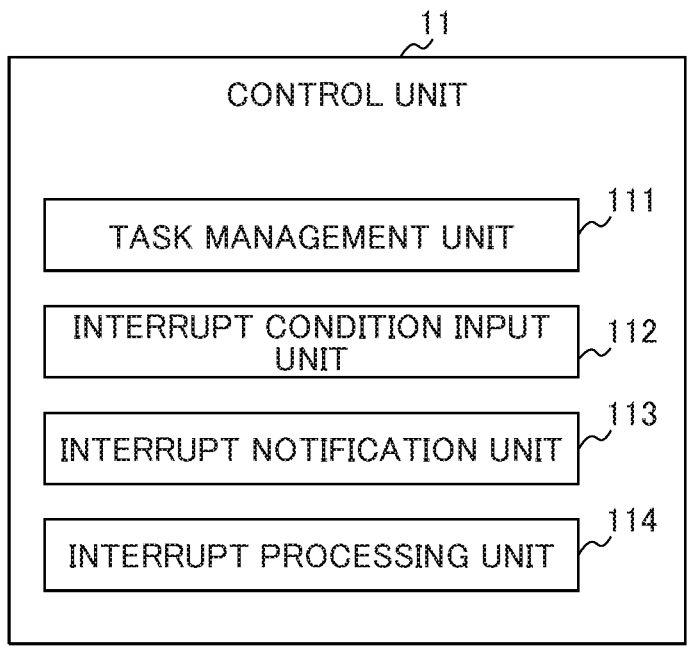
FIG. 2 is a block diagram illustrating a functional configuration of a CPU in the numerical control device according to the embodiment.

FIG. 2 is a block diagram illustrating a functional configuration of the CPU 11 (hereinafter also referred to as a "control unit") of the numerical control device 1. The CPU 11 includes the task management unit 111, the interrupt condition input unit 112, the interrupt notification unit 113, and the interrupt processing unit 114. As described above, these functional units are realized when the CPU 11 executes the system program stored in the ROM 12. Although the CPU 11 includes various control functions for controlling the machine tool and the like in addition to the above-described functions, the control functions are not illustrated.

Figure 3:
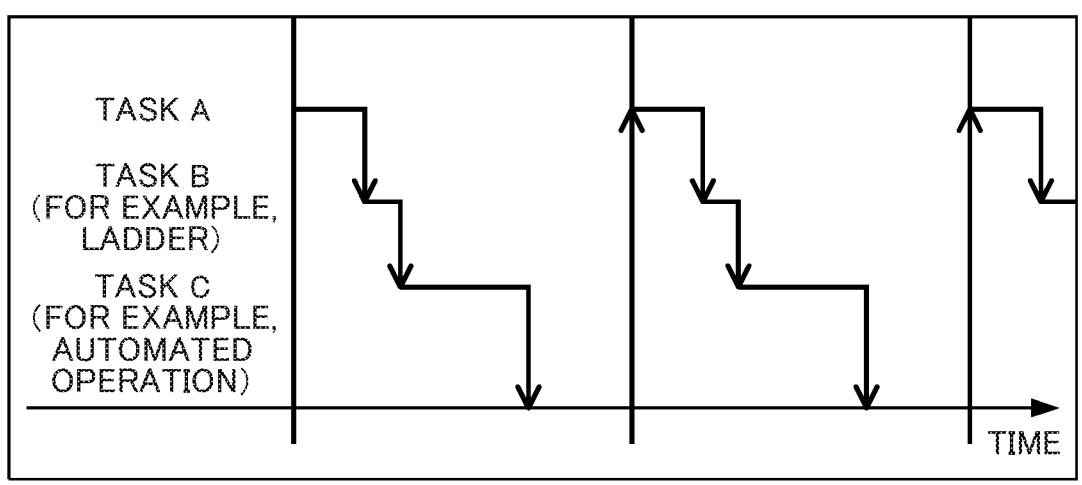
FIG. 3 is a diagram illustrating an example of a multitasking control process according to the embodiment.

The task management unit 111 manages tasks for executing a machining program for machining a work and one or more tasks executed on the background of the tasks executing the machining program (hereinafter, a set of these tasks will be referred to as a "machining processing task group"). The machining processing task group includes a plurality of tasks. Examples of the tasks executed on the background include a task for executing a ladder during the machining and a task for executing an application or the like during the machining. Specifically, the task management unit 111 generates tasks for executing a machining program and one or more tasks executed on the background of the tasks for executing the machining program during machining of the work and controls a multi-tasking process for executing the respective tasks in parallel. It is not always true that all these three tasks are executed by the numerical control device. FIG. 3 illustrates an example of a multi-tasking control process. In FIG. 3, Task A is illustrated as a task for executing an application, Task B is illustrated as a task for executing a ladder, and Task C is illustrated as a task for executing a machining program. The machining program, the ladder, and the application each may be executed by a plurality of tasks. Moreover, since it is not always true that the ladder and the application are executed always (on the background), it is not always true that the three tasks are always generated and executed.

The interrupt condition input unit 112 provides a user interface for allowing a user to designate whether an interrupt function will be enabled or disabled, a user interface for allowing a user to designate an interrupt condition, and a user interface for allowing a user to designate an interrupt program to be executed preferentially by interrupting (that is, suspending) a task being executed among the machining processing task group when the interrupt condition is satisfied. Here, the interrupt condition indicates a condition made up of the name (identification information) of the system data of the numerical control device 1 stored in the system data area and a designated value of the system data and/or a condition (for example, when the system data was referred to) made up of the name (identification information) of the system data.

FIGS. 4A and 4B illustrate an example of a user interface provided by the interrupt condition unit 112. As illustrated in FIGS. 4A and 4B, the interrupt condition unit 112 provides a screen (an interface) for enabling or disabling an interrupt function, setting the interrupt condition, and setting the interrupt program via the display/MDI unit 70. In this way, the user can set data via an operating unit such as a keyboard or a touch panel, for example. Referring to FIG. 4A, the interrupt function is enabled and "#100 EQ 1" set in the interrupt condition sets a program number 600 of an interrupt program executed as an interrupt when a macro variable (#100) is 1. Here, the program number 600 is a program for acquiring various kinds of information of the numerical control device 1, for example, and an example thereof is illustrated below.

O600
98000=#100
98001=#101
98002=R100
98003=#2001
98004=#2001
M99

Here, "O600" indicates a program number of an interrupt program. "#100" and "#101" are system data indicating macro variables, "R100" is system data indicating a signal state, and "#2001" and "#2002" are system data indicating tool correction amounts. Moreover, "#98000" to "#98004" are variables and the values of the system data are substituted and recorded in the respective variables during an interrupt (that is, when the macro variable "#100" is 1).

Referring to FIG. 4B, program commands are set in the field of an interrupt program instead of the program number 600. In this way, a program number or program commands can be input in an input field of an interrupt program.

The interrupt notification unit 113 monitors system data set in the interrupt condition designated in advance and outputs an interrupt command upon detecting that the interrupt condition is satisfied. More specifically, the interrupt notification unit 113 notifies (outputs to) the CPU 11 of an interrupt command corresponding to the interrupt condition when a condition made up of the name (identification information) of the system data and a designated value of the system data is designated as the interrupt condition and the value of the system data designated in the interrupt condition matches the designated value. Moreover, the interrupt notification unit 113 notifies (outputs to) the CPU 11 of an interrupt command corresponding to the interrupt condition when a condition made up of the name (identification information) of the system data is designated as the interrupt condition and the system data designated in the interrupt condition is referred to.

Upon receiving the interrupt command from the interrupt notification unit 113, the interrupt processing unit 114 suspends tasks being executed to execute an interrupt program corresponding to the interrupt command (that is, corresponding to the interrupt condition). Specifically, the interrupt processing unit 114 may generate an interrupt task for executing the designated program as an interrupt. The interrupt processing unit 114 saves the states of the tasks being executed before executing the interrupt program and restores the suspended tasks to the states at the suspension time to resume the suspended tasks after the interrupt program is executed (ends).

Figure 5:
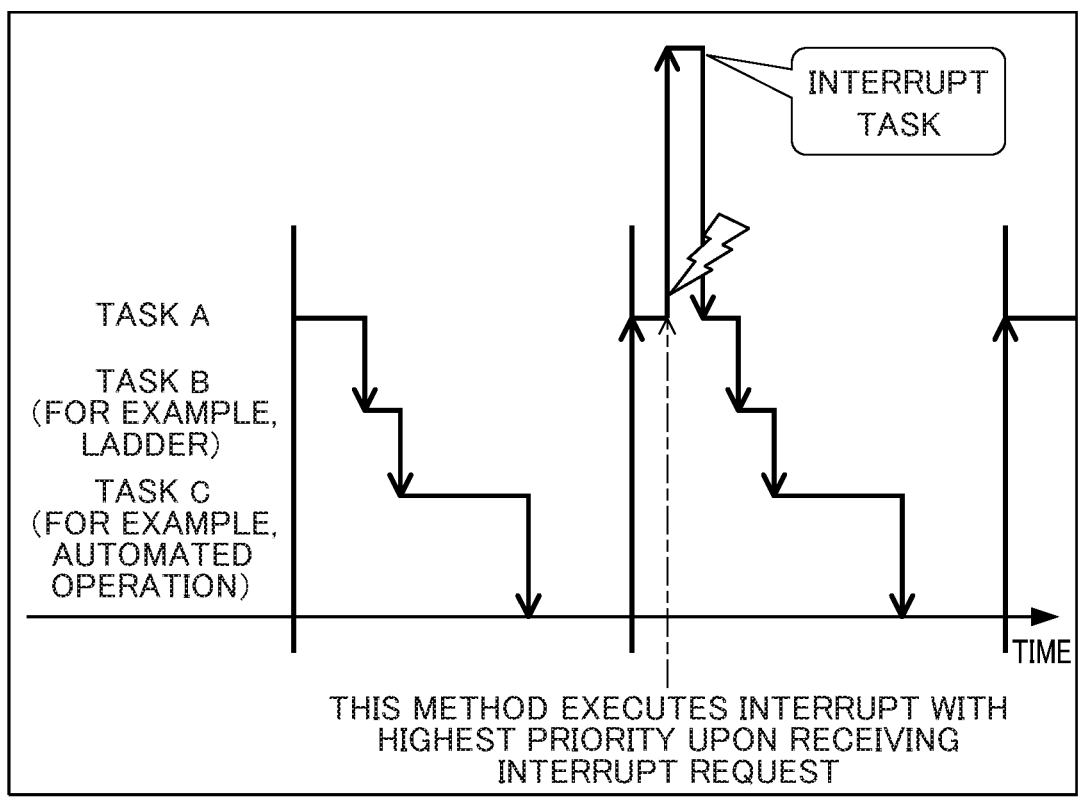
FIG. 5 is a diagram illustrating an example of an operation during interrupt processing according to the embodiment.

FIG. 5 illustrates an example of an operation during the interrupt processing. In FIG. 5, Task A is illustrated as a task for executing an application, Task B is illustrated as a task for executing a ladder, and Task C is illustrated as a task for executing a machining program. The machining program, the ladder, and the application each may be executed by a plurality of tasks. As illustrated in FIG. 5, upon receiving the interrupt command from the interrupt notification unit 113, the interrupt processing unit 114 suspends a task (in this example, Task A) being executed at that time, generates an interrupt task, and executes the interrupt program with the highest priority. As described above, the interrupt processing unit 114 saves the state of Task A being executed before executing the interrupt program and restore the suspended Task A to the state at the suspension time to resume the suspended task A after the interrupt program is executed (ends). By doing so, unlike the conventional technology, for example, even when a ladder or an application is executed by the background task, for example, since the task is suspended, it is possible to acquire accurate system information (the value of the system data designated by the interrupt program) when the interrupt condition is satisfied. Hereinabove, the embodiment of the respective functional units of the numerical control device 1 of the present invention has been described on the basis of the configuration of the numerical control device 1.

Figure 6:
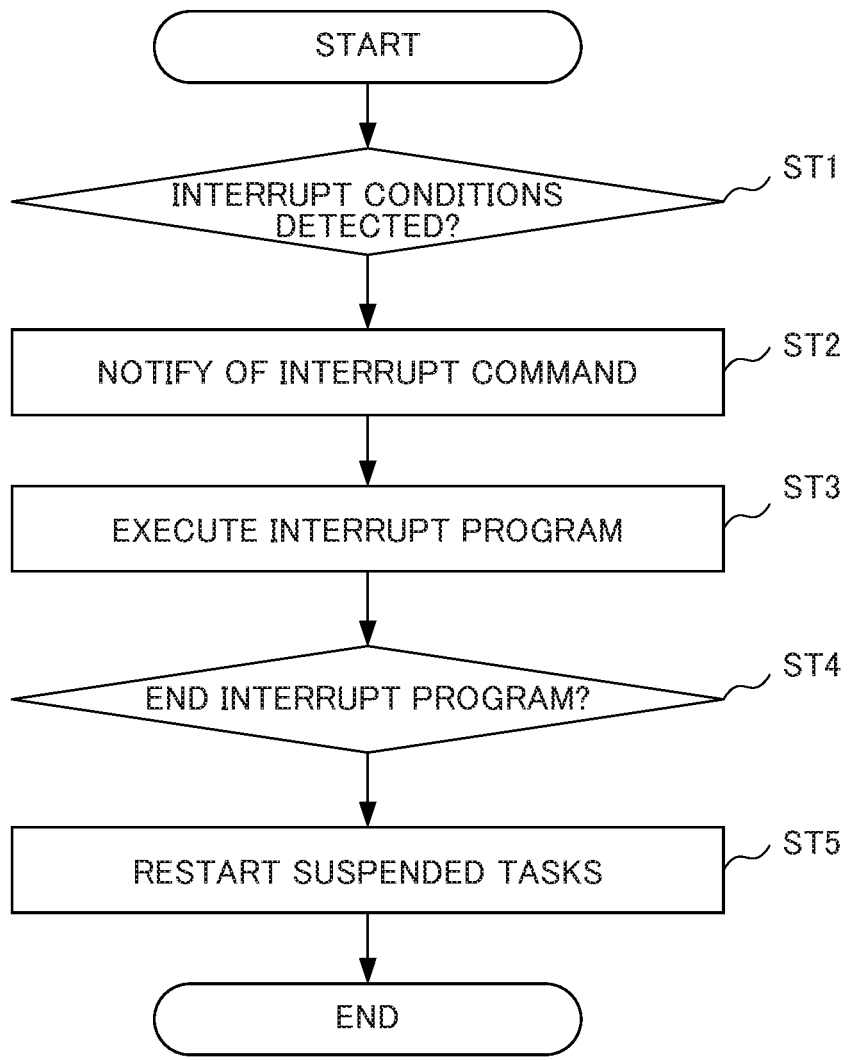
FIG. 6 is a flowchart illustrating the flow of processes performed by the numerical control device according to the embodiment.
Figure 7:
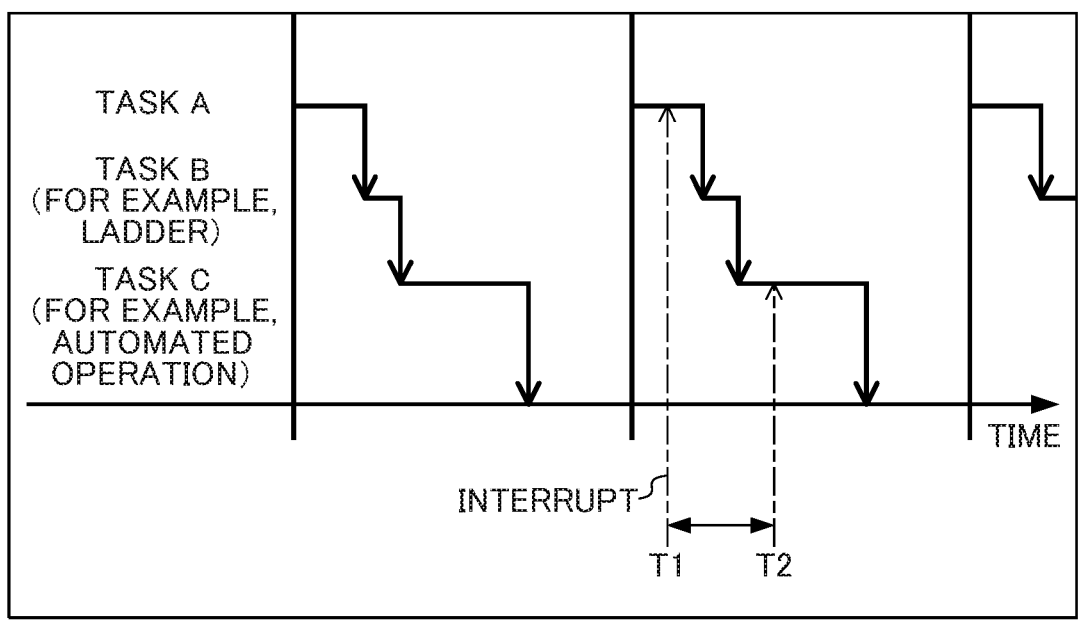
FIG. 7 illustrates an example of an operation during interrupt processing according to the conventional technology.

Next, the flow of a series of processes of the numerical control device 1 according to the embodiment of the present invention will be described with reference to FIG. 6. FIG. 6 is a flowchart illustrating the flow of processes performed by the numerical control device 1 according to the present embodiment. It is assumed that, in addition to a task for executing a machining program for machining a work, the numerical control device 1 performs a multi-tasking process with respect to a task for executing a ladder on the background during the machining, for example, and a task for executing a control application of a peripheral device, for example. Moreover, it is assumed that the interrupt condition input unit 112 has enabled an interrupt function and has set an interrupt condition and an interrupt program to be executed preferentially by interrupting (that is, suspending) these tasks being executed when the interrupt condition is satisfied.

Referring to FIG. 6, in step ST1, the interrupt notification unit 113 monitors system data set in the interrupt condition designated in advance and detects whether the interrupt condition is satisfied. When it is detected that the interrupt condition is satisfied (Yes), the flow proceeds to step ST2. When the interrupt condition is not satisfied (No), the flow proceeds to step ST1.

In step ST2, the interrupt notification unit 113 notifies (outputs to) the CPU 11 of the interrupt command.

In step ST3, the interrupt processing unit 114 suspends tasks being executed presently after saving the states thereof and executes an interrupt program corresponding to the interrupt command (that is, corresponding to the interrupt condition).

In step ST4, the interrupt processing unit 114 detects whether execution of the interrupt program has ended. When it is detected that execution of the interrupt program has ended (Yes), the flow proceeds to step ST5. When execution of the interrupt program has not ended, the flow returns to step ST4.

In step ST5, the interrupt processing unit 114 restores the suspended Task A to the state at the suspension time to resume the suspended Task A.

According to the present embodiment, it is possible to provide the numerical control device 1 that execute a designated program as an interrupt by suspending a task for executing a machining program for machining a work, a task for executing a ladder on the background during the machining, and a task for executing an application executed on the background during the machining when a designated condition is satisfied. In this way, it is possible to know an accurate value of system data related to the numerical control device when the interrupt condition is satisfied, for example. Moreover, since it is possible to refer to the value of system data at an arbitrary time point by setting an interrupt condition during debugging of a machining program or a ladder or an application executed on the background, it is possible to perform debugging efficiently. Moreover, it is possible to record the contents and the like of DI/DO when an alarm occurs during maintenance of the numerical control device 1.

According to the present embodiment, it is possible to designate an interrupt condition and an interrupt program via a user interface provided by the interrupt condition unit 112. Due to this, since it is not necessary to correct a machining program in order to designate the interrupt condition and the interrupt program, advanced programming knowledge is not required and interrupt processing can be executed easily.

While embodiments of the present invention have been described above, the present invention is not limited to the above-described embodiments. Moreover, the advantageous effects described in the present embodiment are only exemplary ones of most preferable effects produced by the present invention, and the advantageous effects of the present invention are therefore not limited to those described in the embodiment of the present invention.

The interrupt processing by the numerical control device 1 is realized by software. When the interrupt processing is realized by software, programs that constitute the software are installed in a computer. Moreover, these programs may be recorded on a removable medium to be distributed to users and may be distributed by being downloaded to a computer of a user via a network.

EXPLANATION OF REFERENCE NUMERALS

1: Numerical control device
11: CPU
111: Task management unit
112: Interrupt condition input unit
113: Interrupt notification unit
114: Interrupt processing unit
12: ROM (storage unit)
13: RAM

What is claimed is:
1. A numerical control device including a control unit, wherein
the control unit includes:
a task management unit that manages a task group including at least a first group of tasks that execute a machining program that machines a work and a second group of tasks that do not execute the machining program but execute during the machining and execute on a background of the first group of tasks that execute the machining program;
an interrupt notification unit that monitors system data set to an interrupt condition designated in advance and outputs an interrupt command upon detecting that the interrupt condition is satisfied; and an interrupt processing unit that interrupts and suspends the tasks being executed among the task group at a time point when the interrupt command was received and suspends the first group of tasks and the second group of tasks included in the task group to execute a predetermined interrupt program as an interrupt with a highest priority on the basis of the interrupt command output by the interrupt notification unit, and thereby obtain a value of arbitrary system data including a value of a signal designated in advance, a value of a variable designated in advance, or an offset value designated in advance, when the interrupt is executed.

2. The numerical control device according to claim 1, further comprising:

a storage unit, wherein the interrupt program further executes a process of storing, in the storage unit, the value of arbitrary system data when the interrupt is executed.

3. The numerical control device according to claim 1, further comprising:

a display, wherein the control unit further includes:

an interrupt condition input unit that provides a user interface for designating the interrupt condition and the interrupt program executed as the interrupt when the interrupt condition is satisfied.

4. The numerical control device according to claim 3, wherein the interrupt condition input unit further provides a user interface for enabling or disabling an interrupt function.

\* \* \* \* \*